US012718782B2

(12) United States Patent
Bonjour

(10) Patent No.: US 12,718,782 B2
(45) Date of Patent: Aug. 25, 2026

(54) ACCESSORY TRAY FOR MUSIC INSTRUMENT

(71) Applicant: NBO SARL, Prilly (CH)

(72) Inventor: Nathan Bonjour, Prilly (CH)

(73) Assignee: NBO SARL (CH)

( * ) Notice: Subject to any disclaimer, the term of this patent is extended or adjusted under 35 U.S.C. 154(b) by 262 days.

(21) Appl. No.: 18/291,584

(22) PCT Filed: Mar. 21, 2022

(86) PCT No.: PCT/EP2022/057354
§ 371 (c)(1),
(2) Date: Jan. 24, 2024

(87) PCT Pub. No.: WO2023/006257
PCT Pub. Date: Feb. 2, 2023

(65) Prior Publication Data
US 2024/0347026 A1 Oct. 17, 2024

(30) Foreign Application Priority Data
Jul. 26, 2021 (EP) .................................... 21187770

(51) Int. Cl.
*G10D 13/10* (2020.01)

(52) U.S. Cl.
CPC .................................... *G10D 13/10* (2020.02)

(58) Field of Classification Search
CPC ........ G10D 13/02; G10D 13/10; G10D 13/26; G10H 1/00
See application file for complete search history.

(56) References Cited

U.S. PATENT DOCUMENTS

| | | | | |
|---|---|---|---|---|
| 4,466,596 | A | 8/1984 | Cohen | |
| 5,684,258 | A | 11/1997 | Liao | |
| 9,607,590 | B1 | 3/2017 | Liao | |
| 2003/0001054 | A1 | 1/2003 | Sargent | |
| 2014/0123831 | A1 | 5/2014 | Dunnett | |
| 2016/0037246 | A1 | 2/2016 | Murata | |
| 2018/0217636 | A1 * | 8/2018 | McNamara | F16B 2/12 |

FOREIGN PATENT DOCUMENTS

| | | | |
|---|---|---|---|
| BR | PI0804441 | A2 | 7/2010 |
| GB | 2042056 | A | 9/1980 |

* cited by examiner

*Primary Examiner* — Kimberly R Lockett

(57) ABSTRACT

The present invention concerns a device comprising a tray and a fastener for releasably attaching the tray to a music instrument, in particular a drum. The device preferably comprises two or more articulations adapted for adjusting and locking a position of the tray with respect to the fastener. The tray comprises a support surface the orientation of which is adjustable in such a manner so as to be able to prevent said object placed loosely on said support surface from falling down under the force of gravity. Preferably, the tray can be folded down when not being used for saving space.

20 Claims, 5 Drawing Sheets

ACCESSORY TRAY FOR MUSIC INSTRUMENT

TECHNICAL FIELD

The present invention generally relates to the field of music instruments and accessories for the latter. More specifically, the invention relates to a device comprising a tray, the device comprising a fastener for attaching the device to a musical instrument or to a related support, in particular to a drum or related support.

BACKGROUND ART AND PROBLEMS SOLVED BY THE INVENTION

For players of music instruments, it has generally been necessary to make use of mounting devices for connecting an accessory directly to the music instrument.

For example, there are several patents that are concerned with the attachment of a microphone to a drum, for example, such as U.S. Pat. No. 4,466,596, US 2003/0001054 A1, US 2014/0123831 A1, and US 2016/037246 A1.

U.S. Pat. No. 9,607,590 B1, on the other hand, discloses a drum counterhoop clamping device for stably clamping a cymbal or a cowbell to a drum.

U.S. Pat. No. 5,684,258 discloses a device holder for fastening to a drum to hold a cowbell, a microphone or a cymbal.

The devices disclosed in the cited prior art documents are adapted for attachment to the counterhoop of a drum. They may comprise a clamp for clamping to the counterhoop and generally an articulation allowing a certain adjustment of the position of the instrument or microphone that is attached by way of the device.

With the advent of digital music and smartphones, the needs of musicians have further developed. For example, many musicians work with computers when playing their instrument, wherein the computer may conduct manifold tasks, such as assisting in recording, mixing, playing music itself to provide the environment of a band if the musician wishes to simulate the playing in a band, and so forth. Furthermore, the musician generally also carries other accessories, related or not to the playing of music, such as a smartphone, a computer mouse, a computer tablet, midi controller, a track pad, hand-held or smaller percussion instruments, a bunch of keys, a wallet, music paper, just to mention a few.

Currently, a percussionist, for example, places these objects and accessories on a small table or tabouret next to his or her seat, so as to be at arm's length from these objects. Similar solutions apply with other instruments.

It is an objective of the present invention to provide a device which addresses the problems of the prior art. In particular, it is an objective of an invention to avoid the need for a separate table or stool for placing the music player's accessories, in particular accessories needed when playing music or practicing.

A further objective of the invention is to provide a possibility for a music player, for example a percussionist, to conveniently put away objects in such a manner that the objects remain within the player's reach when playing music. It is a further objective to provide a device that is convenient and consumes little space, in particular when not used. It is an objective of the invention to provide an accessory, the position of which can be adjusted, and which preferably allows a computer, smartphone or music notes, or other personal items, to be effectively tidied up during playing music.

It is also an objective of the invention to solve the above problems while taking into account vibrations that may occur during music playing, such as drum playing, and stability. It is thus an objective to provide a solution that is suitable to withstand shocks, mechanical stress, vibrations, and the like.

Further objectives and problems addressed by the present invention will become apparent from the description of the aspects and embodiments of the invention herein below.

SUMMARY OF THE INVENTION

The present invention relates to device comprising a tray, adapted for connection to a music instrument, in particular a drum. Remarkably, the device of the invention addresses the problems and objectives depicted above.

In an aspect, the invention provides a device comprising a tray, a fastener for fastening the device to a music instrument, preferably a drum, two or more articulations adapted for adjusting and blocking a position of the tray with respect to the fastener, wherein said tray preferably comprises a support surface adapted for putting an object on said tray.

In an aspect, the invention provides a device comprising a tray, a fastener for fastening the device to a music instrument, preferably a drum, and, first and second articulations adapted for adjusting and blocking a position of the tray with respect to the fastener, wherein said tray comprises a support surface adapted for putting an object on said tray.

In an embodiment, said first articulation comprises a first axis of pivoting and said second articulation comprises a second axis of pivoting, wherein and second axis extend substantially in a direction that is perpendicular to the direction of the first axis.

In an embodiment, said fastener comprises a housing or guiding rail and a first jaw that is movably provided in said housing or guiding rail, wherein a second jaw is rigidly connected to said housing or guiding rail, preferably at an extremity of said housing or guiding rail.

In an embodiment, said first and/or second jaws comprise concave and/or rounded clamping surfaces, having forms adapted for clamping a cylindrical element.

In an embodiment, said concave and/or rounded clamping surfaces form a canal.

In an embodiment, wherein said fastener is suitable to clamp a cylindrical rod (81) having a diameter of from 0.5 cm and up to 5 cm, preferably 0.7 and up to 4.5 cm.

In an embodiment, wherein said fastener and said first articulation are provided so as to conduct a rotation of at least 90° of said fastener with respect to said articulation, said tray and/or said linkage bar with said first articulation 30 being in an unblocked and/or release position.

In an embodiment, wherein said fastener (20) comprises a threaded rod (23) extending in said housing or guiding rail, wherein said first jaw (27) comprises a threaded bore (55), wherein said threaded rod is threadedly engaged with said threaded rod (23), such that preferably a rotation of said threaded rod results in a linear movement of said first jaw (27) by way of said threaded engagement, said linear movement preferably resulting in said first and second jaws getting closer or moving away from each other for fastening said fastener to, or releasing said fastener from, respectively, said music instrument or an element (3, 81, 82) thereof.

In an embodiment, said housing or guiding rail comprises first and second walls (21, 22) each comprises a hole (51, 52), wherein said threaded rod extends through said holes, and wherein said first jaw (27) is movably housed between said first and second walls (21, 22).

In an embodiment, wherein said fastener (20) comprises a threaded rod (23) and a hand-actionable knob (50), said knob being connected to said threaded rod (23), in such a manner that rotation of said knob results in rotation of said threaded rod and/or displacement of said first jaw (27), wherein said threaded rod comprises an extremity, said knob being preferably connected at said extremity to said threaded rod (23).

In an embodiment, wherein said assembly comprises a friction enhancing or blocking device (57, 58) suitable for avoiding and/or blocking the relative rotational movement between said fastener 20 and said tray (10) and/or of the linkage bar (35).

In an embodiment, said friction enhancing or blocking device (57, 58) comprises one selected from an O-seal, a rubber ring, a washer, said washer being preferably a locking washer (79), for example a tooth lock washer (Kep nut), a serrated or toothed washer, and a pair of toothed interlocking elements (57, 58).

In an embodiment, each toothed interlocking element of said pair of toothed interlocking elements (57, 58) comprises a teeth suitable for complementary engagement with the respective other toothed interlocking element for interlocking and thereby blocking the paid of toothed interlocking elements (57, 58) with respect to each other.

In an embodiment, said pair of toothed interlocking elements (57, 58) comprise a first interlocking element (57) and a second interlocking element (58), the first interlocking element being connected to said fastener (20) and the second interlocking element being connected to said tray (10) and/or to the linkage bar (35).

In an embodiment, wherein said pair of toothed interlocking elements (57, 58) are a pair of Hirth toothed wheels (57, 58).

In an aspect, the invention provides a fastener (20) suitable for clamping an object (10), such as a tray, to a bar or rod (81), said fastener comprising first and second jaws (27, 28) and housing or guiding rail (25), wherein said first jaw (27) is movably provided in said housing or guiding rail, wherein a second jaw (28) is rigidly connected to said housing or guiding rail, preferably at an extremity of said housing or guiding rail.

In an embodiment, said first and/or second jaws comprise concave and/or rounded clamping surfaces (53, 54), having forms adapted for clamping a cylindrical element (81).

In an embodiment, said concave and/or rounded clamping surfaces (53, 54) form a canal.

In an embodiment, said fastener is suitable or adapted to clamp a cylindrical rod (81) having a diameter of from 0.5 cm and up to 5 cm, preferably 0.7 and up to 4.5 cm.

In an embodiment, said fastener further comprises a threaded rod (23) extending in said housing or guiding rail, wherein said first jaw (27) comprises a threaded bore (55), wherein said threaded rod is threadedly engaged with said threaded rod (23), such that preferably a rotation of said threaded rod results in a linear movement of said first jaw (27) by way of said threaded engagement, said linear movement preferably resulting in said first and second jaws getting closer or moving away from each other for fastening said fastener to, or releasing said fastener from, respectively, said music instrument or an element (3, 81, 82) thereof.

In an embodiment, the fastener comprises a hand-actionable fastening element (60) preferably comprises one selected from a handle, a lever, a knob, a turning wheel, a butterfly screw, and a butterfly nut.

In another aspect, the invention provides a fastener suitable for clamping an object, such as a tray, to a bar or rod, said fastener comprising first and second jaws. The bar or the rod can be at any angle, for example a horizontal bar or a vertical rod.

Further aspects and preferred embodiments of the invention are defined herein below and in the appended claims. Further features and advantages of the invention will become apparent to the skilled person from the description of the preferred embodiments given below.

Figure 1:
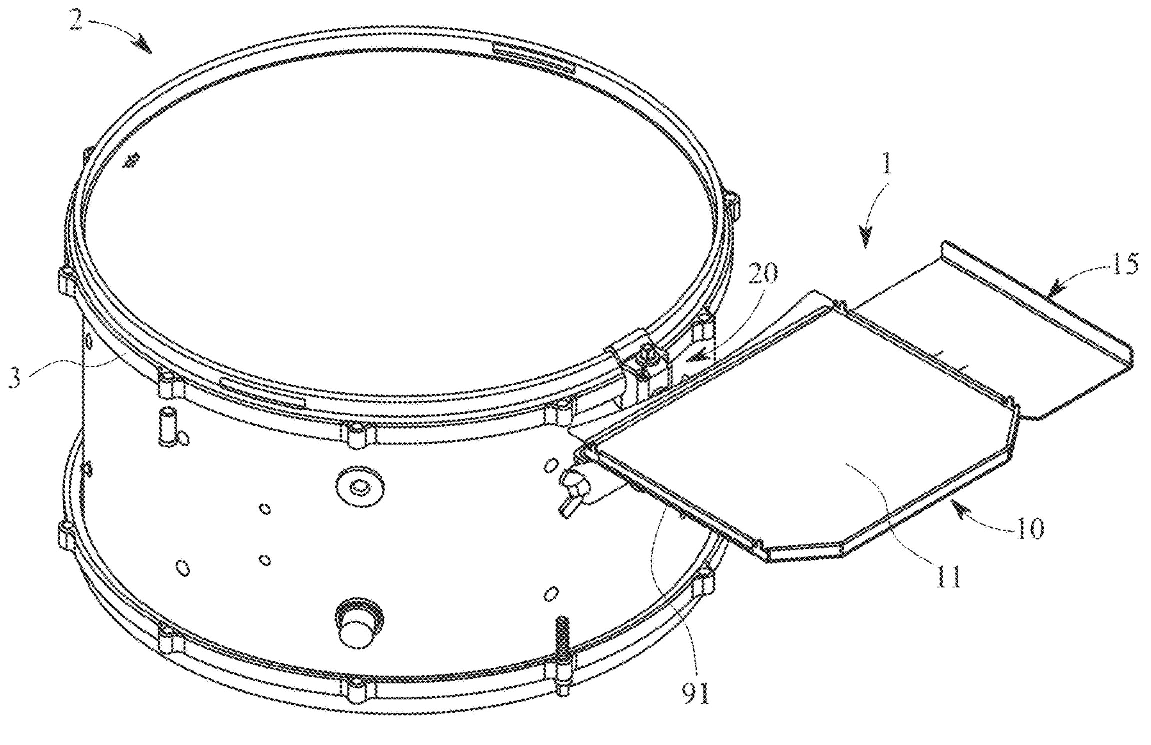
FIG. 1 is a perspective view of an embodiment of the device of the invention fixed to a drum in a position of use.

Hereinafter, preferred and exemplary embodiments of the device of the invention are described with reference to the figures, in order to illustrate the invention, without any intention to limit the scope of the present invention.

DETAILED DESCRIPTION OF THE PREFERRED EMBODIMENTS

The present invention is directed to a device and a fastener adapted for connection to a music instrument, for example an instrument stand or a drum, the device comprising a tray, allowing a player of the instrument to place objects and in particular loose objects, which the musician can thus pick up and use, possibly also during music playing, if need be. The tray preferably is provided for placing such objects at arm's length while making music. The device of the invention is further suitable for connection to instrument and music stands, as exemplified elsewhere in this specification.

The tray is preferably provided for putting objects that a music player can place on a tray, including hand-held or smaller percussion instruments. Examples of hand-held percussion instruments include a triangle, a tambourine, a bell (such as a cowbell), all sorts of shakers, cymbals, just to mention a few. The tray also allows placing thereon a hand-held microphone, for example. A further group of objects that music player preferably has within reach are electronic and computer-based or equipment, generally for wirelessly controlling other equipment that is placed at a distance that is longer than the arm's length environment.

Such electronic equipment includes a smartphone, a computer mouse, a computer tablet, a track pad, a midi controller, a control panels, a dash board, a laptop and digital accessories in general.

Preferably, the tray of the invention is also suitable to place and possibly attach music paper, sheet music, and the like. Furthermore, some instruments use special tools for making adjustments or for playing the instrument, which may be placed on the tray.

The tray of the invention is preferably also suitable to place personal items, smartphones, keys, a wallet, and so forth All these objects are thus preferably placed loosely on a support surface of the tray, the objects thus not being particularly attached or immobilized, wherein the tray is adapted for allowing a user to adjust the orientation of the tray, preferably in such a manner that the support surface extends substantially in parallel to the ground level (horizontal). In such a position of use, the tray prevents the one or more objects placed on the tray from falling to the ground under the effect of gravity.

Music paper and sheet music may be an exception in that due to their lightweight nature they are at risk of being blown away. The tray of the invention is preferably provided so as to attach such sheet music, as will be set out elsewhere in this specification.

For the purpose of the present specification, the term "substantially", if used in the context of the orientation with respect to a comparison plane or line, is understood to include an angle of ±15°, preferably ±10°, and most preferably ±5°, with respect to said comparison plane or line. For example, the wording "substantially in parallel to horizontal" and similar wording is intended to mean within and including an angle of ±20° compared to horizontal.

FIG. 1 shows an embodiment of the device in a position of use, the tray 1 thus having been adjusted such that the support surface 11 extends substantially in parallel to the ground (horizontally). The device is connected to a music instrument, here a drum 2, by way of a fastener 20. The drum comprises a counterhoop 3, and the fastener 20 is adapted for being rigidly but releasably connected to the counterhoop 3, preferably without interfering with the quality and characteristics of the sound produced by the instrument. An auxiliary tray 15 (also referred to as extension tray) can also be seen in FIG. 1. The auxiliary tray of this embodiment is releasably connected to the main tray 10, in such a manner that a user can manually attach and/or detach the auxiliary tray from the main tray. This will be described in more detail elsewhere in this specification. The purpose of the auxiliary tray is to provide additional support surface available to the user for putting an object on the tray, for example in case a larger object is to be supported by the tray or several objects are to be put on the tray.

Figure 2:
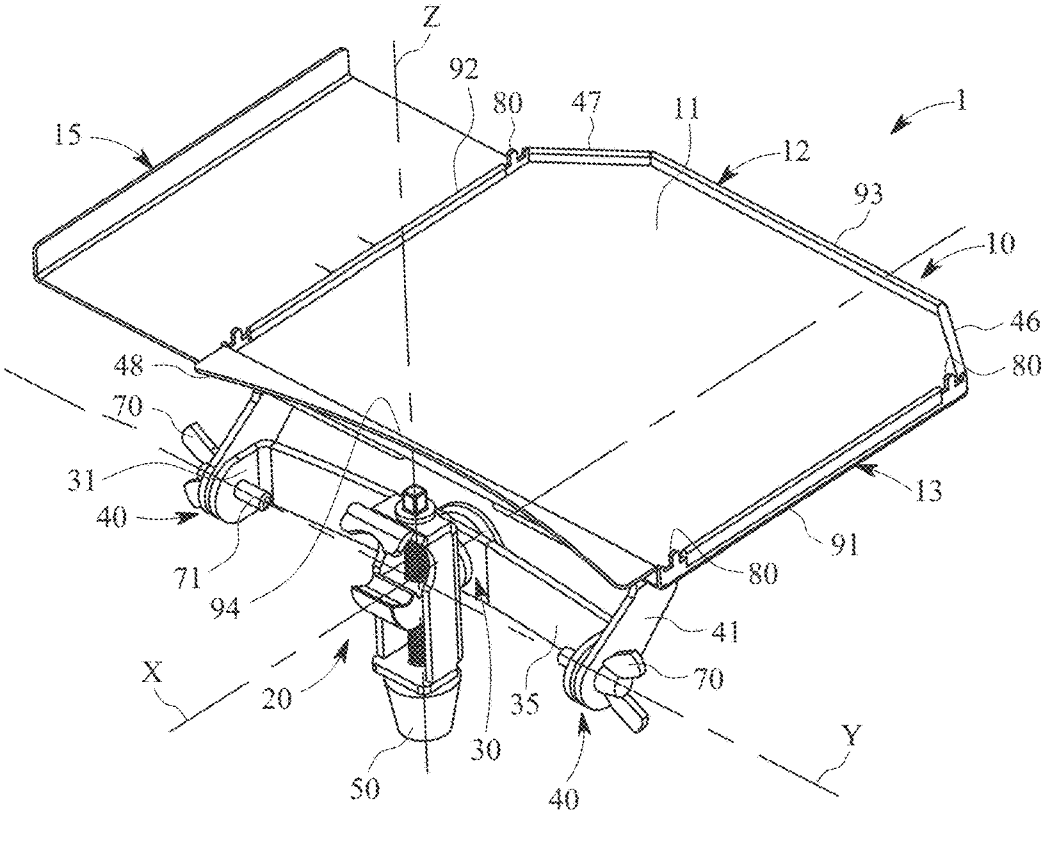
FIG. 2 is a top-down perspective view of the device of FIG. 1 detached from the drum.

In FIG. 2 the device 1 is shown detached from the drum 2 showing some details of the fastener 20 and of the articulations 30 and 40 connecting the tray 10 to the fastener. The device 1 preferably comprises two pivotable articulations 30, 40, wherein the two axes, x and y, of the two articulations extend preferably in a substantially perpendicular direction with respect to each other, such that the tray can be adjusted in preferably any orientation, or at least a large number of possible orientations, with respect to the instrument.

Axes x and y as shown in FIG. 2 (and also FIG. 5A) are horizontal, whereas axis z extends vertically and corresponds to the axis of displacement of the mobile jaw 27 of the fastener, as described in more detail elsewhere in this specification. The arrangement as shown represents the basic configuration, in which axis z is perpendicular to both the two axes, x and y, of the first and second articulations 30, 40. Upon rotation of the fastener 20 with respect to axis x, z remains perpendicular to x but changes its angular position with respect to axis y.

In the embodiment shown, the tray 10 comprises a rim 12 extending along at least part of the circumference 13 of the tray 10, The rim has the purpose of retaining objects on the tray even if the support surface 11 does not exactly extend horizontally, or if a user inadvertently touches or pushes an object on the tray when playing the instrument. Furthermore, some instruments such as percussion instruments may cause vibrations when played, and the rim thus prevents the objects from falling down due to such vibrations.

The tray 10 in the embodiment of FIG. 1 comprises an upper support surface 11 having, in this particular case a surface area of about 320 cm2. More generally, as specified in the claims, the said surface of the main train covers an area of 25 cm2 or more, preferably 100 cm2 or more, more preferably 200 cm2 or more, and most preferably 300 cm2 or more. Preferably said support surface is a flat, even and/or smooth surface.

In a preferred embodiment, the tray has a substantially rectangular outline 13. Accordingly, the tray 10 comprises four main sides, 91, 92, 93, 94. Side 94 is proximal to and oriented towards the instrument and is therefore also referred to as the attachment or proximal side 94. In the embodiment shown, side 91 is oriented towards the user, which is a person playing the instrument, and is therefore referred to as the front side, whereas the opposed side, side 92, is referred to as the rear side. Side 93 may be referred to as the free lateral sides, as sides 91-93 are referred to as "free" or "free standing" sides, where the device is not connected to the instrument.

In the embodiment shown, two corners 46, 47, of the tray 10, oriented distally from the instrument 2, are truncated or rounded.

On the attachment side 94, the tray comprises a particularly formed appendage 48, where the rim 12 of the tray is formed so as to follow the geometry of the instrument.

In the embodiment shown, where the device is for attachment to a drum 2, the appendage 48 is rounded, giving a more harmonic visual integration of the device 1 with the instrument, in that the appendage 48 follows to some extent the periphery of the counterhoop 3.

Figure 3:
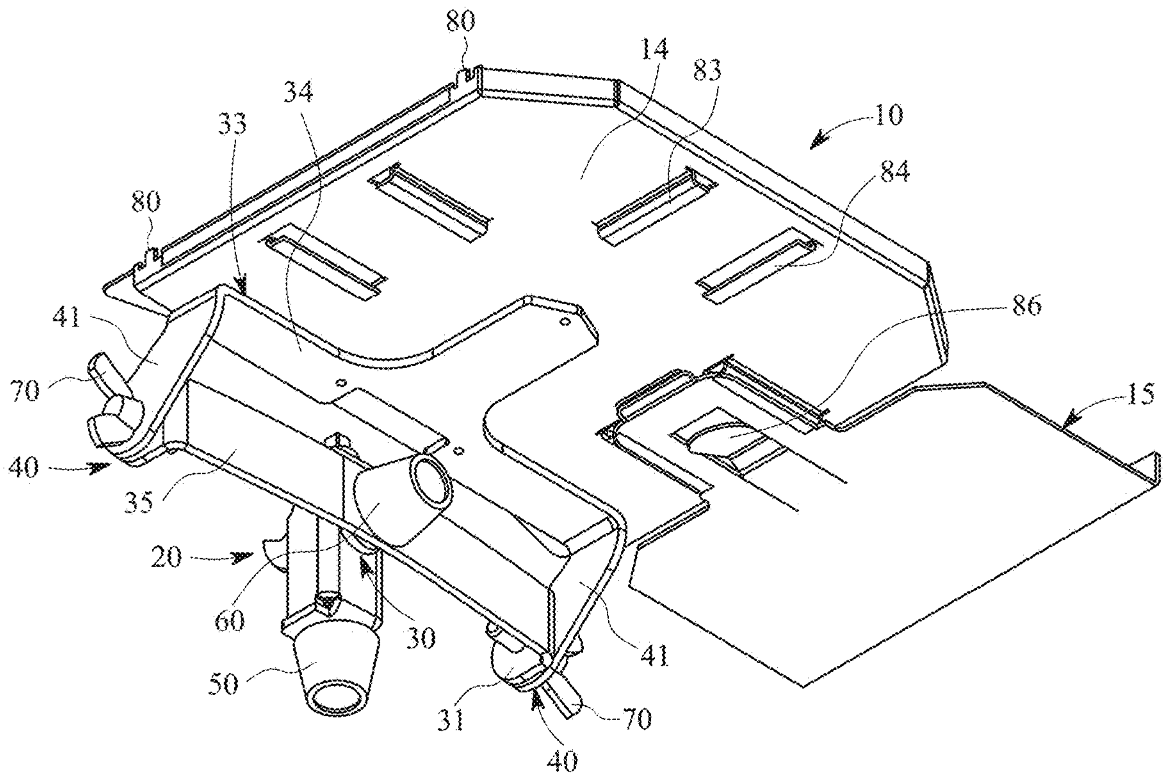
FIG. 3 is a bottom-up perspective view of the device of FIG. 1 detached from the drum.

In FIG. 2 and FIG. 3, the articulations 30 and 40 allowing for the adjustment and blocking or locking of the tray 10 with respect to the fastener 20 can be seen.

Preferably, each of the two articulations 30 and 40 is a pivotable articulation, which can independently be in a blocked, arrested, stopped or even locked state where rotation is not or only hardly possible, and in an unblocked state where a user can pivot the tray with respect to the corresponding articulation 30 or 40 and thereby adjust the orientation of the tray. Both articulations 30, 40, preferably comprise a hand-actionable blocking element 60, 70, which may be in the form of a lever, handle, knob, handle, butterfly nut, butterfly screw, or the like, for example.

Preferably, both articulations comprise a rotation axle formed preferably by a rod 56, 71, and which preferably defines the rotation axis of said articulations.

The first articulation 30 preferably comprises a knob 60, comprising an inner threading, the knob being threadedly engaged with a threaded shaft 56 (FIGS. 4A-4C) rigidly connected with the fastener 20. The tray 10 is connected, via the second articulation 40, to a linkage bar 35. The linkage bar 35 comprises a through hole in the center (not visible), such that the shaft 56 extending through said through hole provides said first articulation 30. The articulation preferably further comprises a locking mechanism, allowing the articulation to be locked in place. In the embodiment shown, the locking mechanism comprises a pair of Hirth toothed wheels 57, 58. A first toothed wheel 57 is rigidly connected to the back side of the fastener 20, while being fitted on the shaft 56 (FIG. 4B). The second, complementary wheel toothed 58 is rigidly connected to the knob 60.

For adjusting an angular position of the first articulation 30, a user turns knob 60 to release the engagement of the two Hirth toothed wheels and allowing rotation of the linkage bar 35 with respect to the fastener 20, with respect to the axis of the threaded shaft 56. For locking the angular position of articulation 30, the user turns the knob 60 so as to tighten the knob on the shaft 56, thereby locking the toothed wheels 57, 58 and bringing them together to form a locking engagement.

As can be seen in FIG. 3, a connection framework 33 is provided for connecting the tray 10 with the linkage bar 35. In the embodiment shown, the framework 33 has an overall shape reminding of a wheel fork, in which a flat, T-shaped base 34 is rigidly connected to the lower side 14 (opposite the support surface 11) of the tray 10. In the embodiment shown, the base 34 is fixed by way of screws, but might also be fixed by welding, gluing or other means for rigidly securing two parts.

The base 34 extends substantially along part of the proximal border 94 of the tray. At both lateral extremities, the framework piece 33 comprises two lugs 41 protruding downwards from the lower surface of the tray. Each of the two lateral lugs 41 comprises a through hole. The lugs 41 further extend substantially in parallel to the two bent extremities 31 of the linkage bar 35, said extremities also containing through holes that are aligned with the through holes of the lugs 41.

The second articulation 40 comprises a threaded shaft 71 that is part of a hand-actionable butterfly screw 70. The through holes at the extremities 31 of the linkage bar 35 comprise inner threading provided for threaded engagement with the outer threading of the of the butterfly screws 70. As the screw shafts 71 extend through the lugs 41 of the framework piece 33, the butterfly screws are provided for tightening the framework piece 33, and thereby the tray 10 to which it is connected, with respect to the linkage bar 35.

In the embodiment shown, the second articulation 40 comprises two separate tightening screws 70 at the two sides or lugs 41 of the fork-like framework piece 33, provided for tightening to the longitudinal linkage bar 35. The linkage bar 35 preferably extends in parallel to the tray and more preferably substantially in parallel to the proximal sideline 94 of the tray 10.

In an embodiment, the second articulation 40 comprises two partial articulations, which are preferably spaced apart. Preferably, the two partial articulations are spaced apart via said linkage bar 35 and are preferably provided at the opposed extremities of the linkage bar.

In a preferred embodiment, the linkage bar 35 extends along the front to rear extension of the tray 10, and preferably along a substantial part (preferably >50% of the length) of that extension. In FIG. 2, the two tightening screws 70 are provided on the left and right sides of the device as shown, corresponding to the rear and front sides of the tray when in use (FIG. 1).

Thanks to the second articulation 40 comprising two spaced apart parts, the entire tray is stabilized in the rear to front extension. The longitudinal linkage bar 35 may thereby also function as a space holder. The two partial articulations increase the stability of the tray and its steadfastness with respect to the vibrations and mechanical shocks that occur during drumming, for example.

Figure 7:
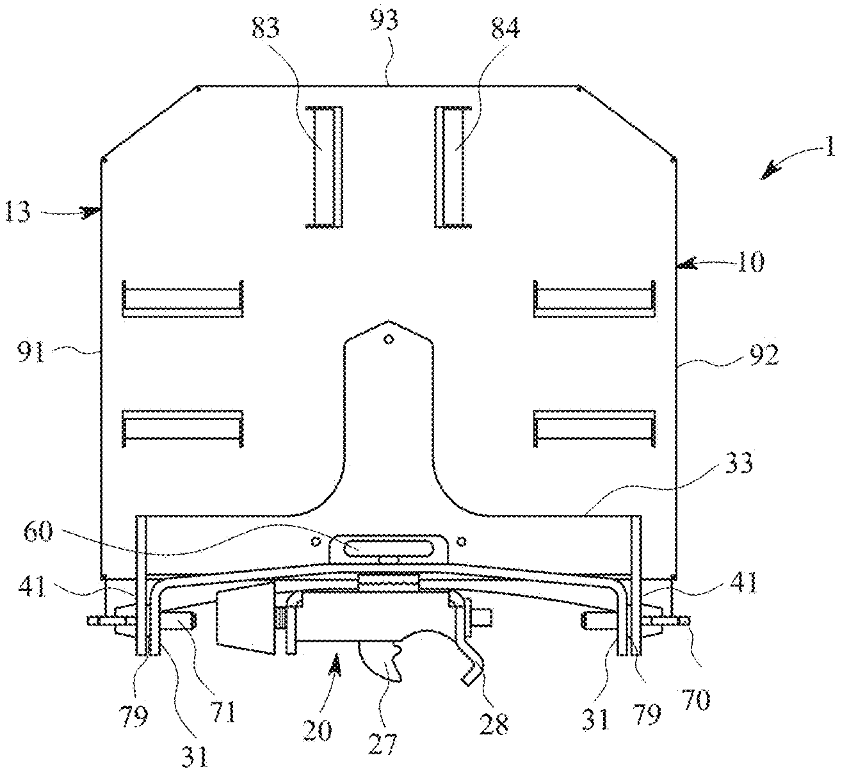
FIG. 7 is a bottom-up view on the device of FIG. 1.

For blocking the second articulation 40, the user preferably tightens both butterfly screws 70. The articulation gets blocked by way of the frictional engagement between the lugs 41 of the framework and the angled extremities 31 of the linkage bar 35. As can be seen in FIG. 7, a washer 79 is provided on the shaft 71, between the extremity 31 of the linkage bar 35 and the lug 41. The washer preferably assists in blocking or locking the linkage bar 35 and the lug 41 when screw 70 is tightened. In the embodiment shown, the washer is a tooth lock washer (Kep nut). Instead of the washer 79, an o-ring or other type of friction enhancing element could be used for assisting in the blocking or locking of the linkage bar 35 with respect to the lug 41, or more generally, of the linkage bar 35 with respect to the try 10.

Since there are two spaced-apart locking screws 70, a pair of Hirth toothed wheels is not necessary for effectively locking the second articulation.

In another embodiment (not shown), the device of the invention comprises a second articulation 40 comprising only one hand-actionable handle, butterfly or knob 70. For example, the device may comprise only one lug 41 and s linkage bar with only one extremity 31 comprising a hole for pivotally connecting with the lug 41. In this case, the second articulation is preferably more centrally provided along the rear to front extension of the tray, in closer vicinity to the first articulation 30. The skilled person may provide the device in such a manner so as to provide a second articulation comprising only one instead of two separate hinges 40. In such a case, it may be appropriate to make use of a paired of Hirth toothed wheels (as with the first articulation 30) or another suitable lock for locking the articulation at an adjusted position.

Figure 6:
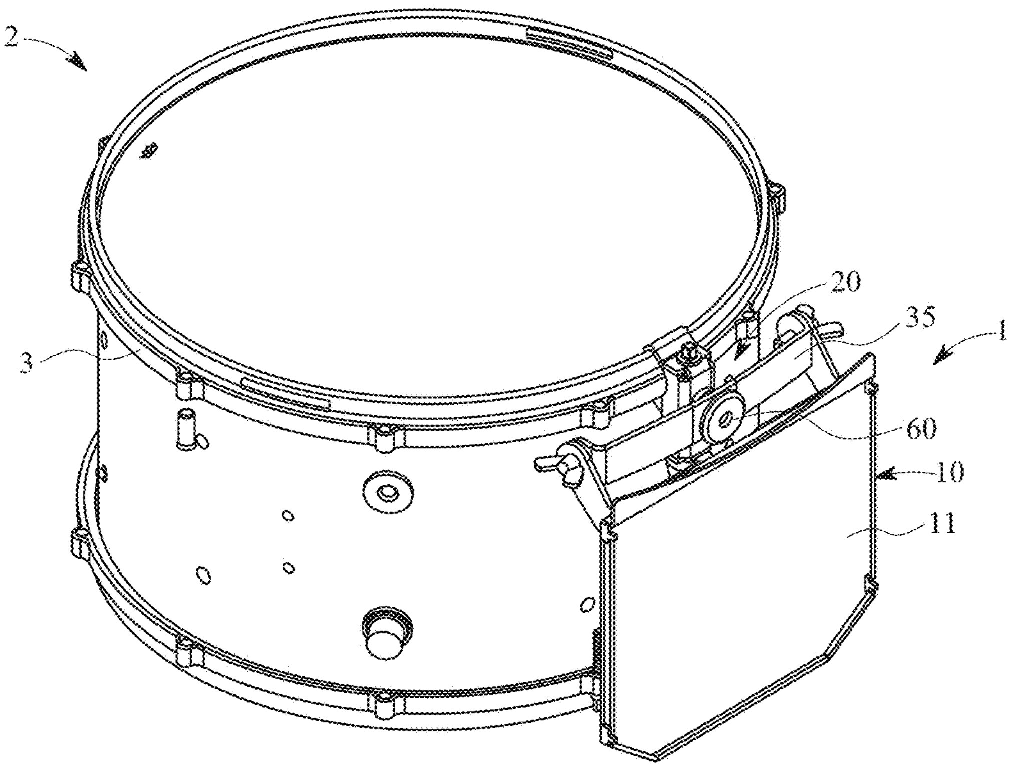
FIG. 6 is a perspective view as in FIG. 1, showing the embodiment in a folded down position of non-use, where the device can be put away.

For passing from the position of use shown in FIG. 1 to the position where the tray is clapped down shown in FIG. 6, the user preferably releases the butterfly screws 70, thereby loosening the articulation 40 and allowing for the tray to be clapped down. In the same manner, the release of the butterfly screws allows for adjustment of an angular position of the tray with respect to linkage bar 35 and thereby with respect to the fastener 20, to which the linkage bar is adjustably connected at the first articulation 30. Tightening screws 70 thus allows for blocking that angular position and stabilizing the position of use shown in FIG. 1. Of course, the tray can be blocked and thereby secured at any angular position, including the position shown in FIG. 6, where the tray is clapped down.

Figure 4A:
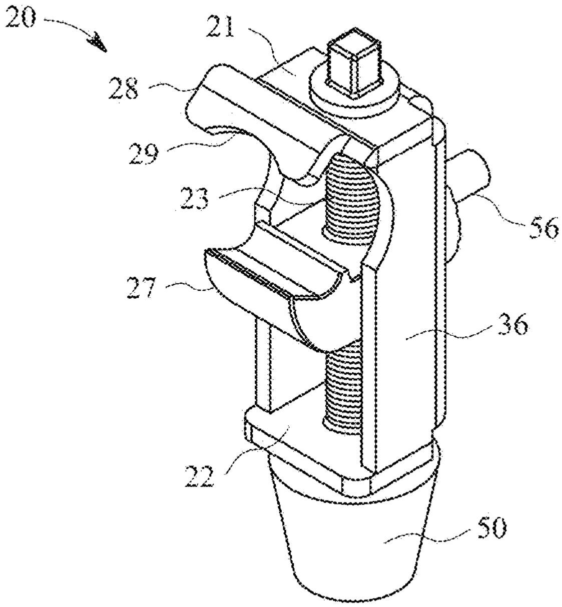
FIGS. 4A, 4B and 4C are front and rear perspective views (A and B) and an exploded view (C) of the fastener used in the device shown in FIGS. 1-3.
Figure 4B:
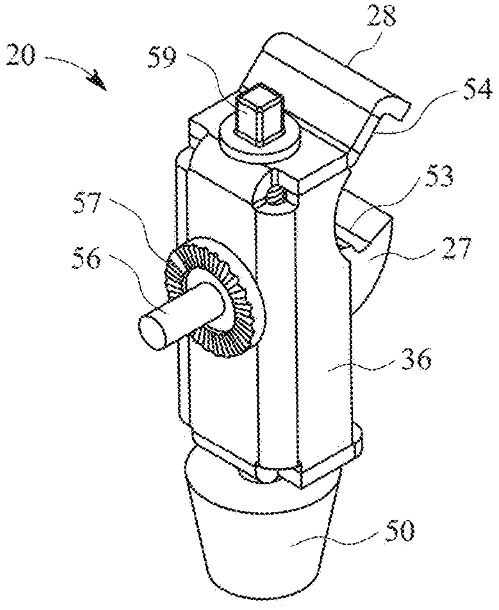
Figure 4C:
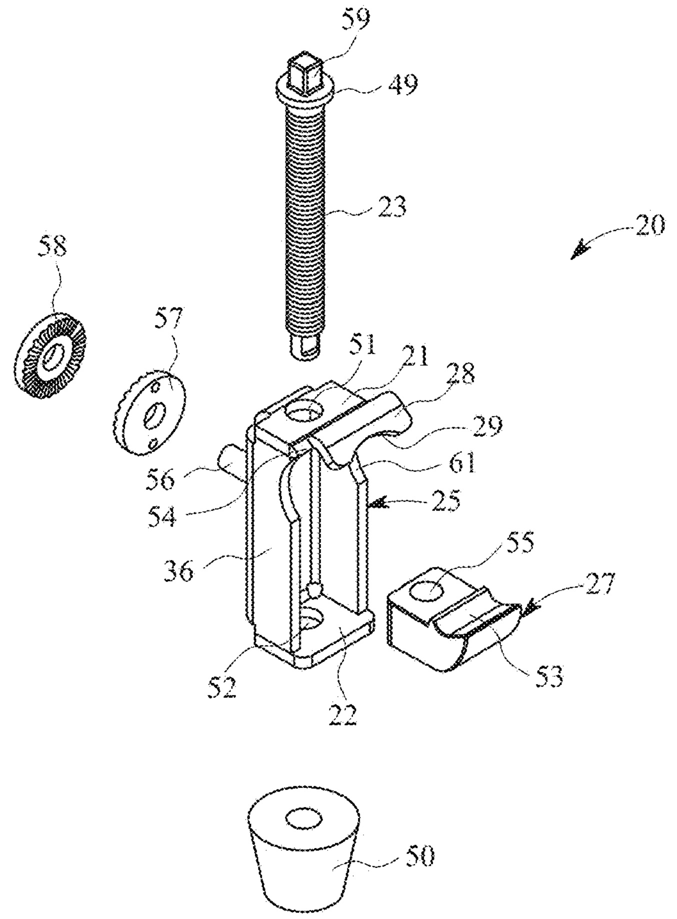

FIGS. 4A, 4B and 4C show the details of fastener 20. As described above, the fastener is lockably articulated with respect to the linkage bar 35 by way of the threaded shaft 56 emerging from the rear side of the fastener (FIG. 4B).

The fastener 20 comprises a housing 25 comprising lateral side, top and bottom walls as well as a rear wall to which said shaft 56 and said Hirth toothed wheel is connected. The terms "top" and "bottom" walls 21, 22 refer to the relative position of these walls as seen in FIGS. 4A-4C, which also corresponds to a preferred position of use as shown in FIG. 1.

On its front side (FIGS. 4A and 4C), the housing comprises an opening, through which a first or mobile jaw 27 is provided in the housing. The mobile jaw 27 comprises a through hole 55 comprising an inner threading, threadedly engaged with the threaded shaft 23, which extends through holes 51, 52 in the upper and lower walls 21, 22, respectively, of the housing. When the shaft is placed in the fastener as shown in FIGS. 4A and 4B, it is retained at the upper wall 21 by way of rim or flange 49 at the first or upper extremity of the shaft. Due to the flange, the threaded shaft 23 of the embodiment shown can be said to comprise a flanged screw head. The second or lower extremity of the shaft is secured to a turning knob 50 provided below the bottom wall 22.

At one extremity of the shaft 23, preferably the extremity opposed to the one where the knob 50 is provided, the shaft 23 comprises a screw head 59, actionable by a tool, such as a spanner, wrench or screwdriver. In the embodiment shown in the figures, the screw head 59 is an external polygonal screw head, in particular a square screw head. Of course, any screw head type that can be actuated by using a tool, including internal polygon type screw heads. In the particular embodiment shown, the square screw head 59 corresponds to the standard wrench used for drums a standard key Jazz drum wrench). The knob 50 and the screw head 59 can be actuated independently one from the other for clamping and/or unclamping the fastener. Accordingly, the fastener 20 can be fastened using either the hand-actionable knob 50 or a tool such as the standard drum wrench, at the option of the user. The user may also opt for actuating both simultaneously, said hand-actionable knob and said screw head by using a tool.

In the embodiment shown, the threaded shaft 23 has an 8 mm diameter (8 mm Machine Screw type outer threading).

It is noted that the housing 25 of the fastener comprises also two lateral side walls 36. When the mobile jaw 27 is inserted in the housing 25 and threadedly engaged with shaft 23, the side walls 36 frame the mobile jaw 27 and thereby block rotation of the mobile jaw 27. Therefore, when a user turns the knob 50, shaft 23 rotates and forces the mobile jaw to move in the corresponding direction along the shaft. The lateral side walls 36 provide or form a guiding rail for said mobile jaw 27, assisting in the linear displacement movement of the mobile jaw upon rotation of the knob 50 and threaded shaft 23.

The fastener further comprises a fixed or immobile or second jaw 28, which here is an upper jaw, rigidly connected, for example formed in one piece, with the housing, here with the upper wall 21. Of course, the fixed jaw could as well be rigidly elsewhere to the housing, for example to the lower wall. Therefore, when a user rotates knob 50 so as to move the mobile jaw 27 towards the fixed jaw 28, the fastener can be fastened to a component part of the music instrument, for example to a bar or to the counterhoop 3 of a drum (FIG. 1). By turning knob 50 in the opposite direction, the fastener can be released from the instrument. The fastener functions as a hand-actionable clamp.

In a preferred embodiment, as shown in FIGS. 4A-4C, the fastener can be manually detached from tray by actuating the hand-actionable fastening element 60. Preferably, the hand-actionable fasting element 60 can be detached, for example unscrewed, from the threaded shaft 56. More generally, the fastener can be detached by disassembling said first articulation.

The fastener is preferably a replaceable fastener. The invention envisages different fasteners, suitable for fastening the tray to different objects, such as bars having different sizes, dimensions and/or forms. The invention also envisages a fastener that is suitable to fasten the tray to a board and/or a table, or another object. The fastener is thus preferably provided detachably, for example manually from the tray. In other embodiments, a tool may be required for detaching the tray from the fastener.

In an embodiment, said fastener 20 is a first fastener, wherein the device allows connecting the tray, at the option of a user, to said first or to a second fastener, wherein said fastener is preferably provided for fastening the tray to an object that is different from said drum hoop 3 and/or bar 81, 82, for example an object that has a similar shape but different dimensions, or an object having another form. For example, the fastener may be adapted for fixing to cylindrical bars having larger dimensions than those disclosed in this specification. The second fastener may differ in that the first and second jaws 27, 28 have different shapes adapted for fixing the fastener to said different object. Preferably, said "different object" is different at least with respect to the form of the object, element or part of the object that is to be gripped by said fastener, in particular that is to be clamped between said first and second jaws.

In some embodiments, the fastener 20 is also provided for allowing the fastening of the device to different objects.

Figure 5A:
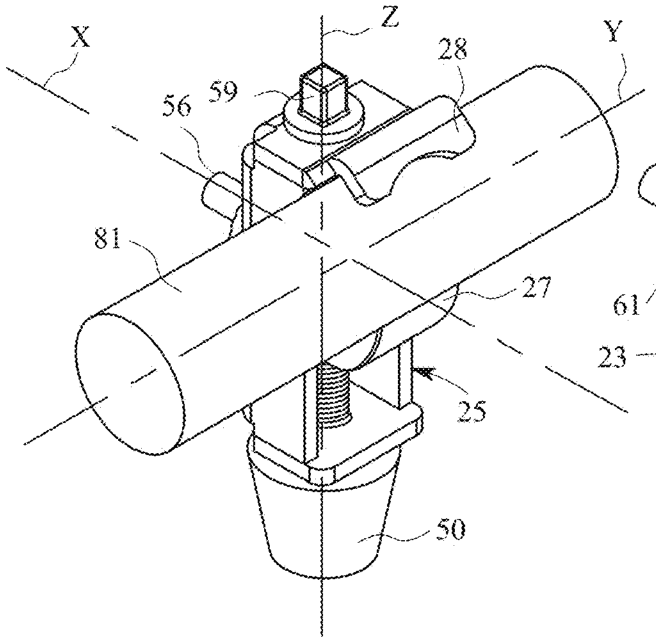
FIGS. 5A and 5B are front perspective views showing the fastener of FIGS. 4A-4C connected to a bar extending tangentially (5A) and perpendicularly to the bar in FIG. 5A (5B).
Figure 5B:
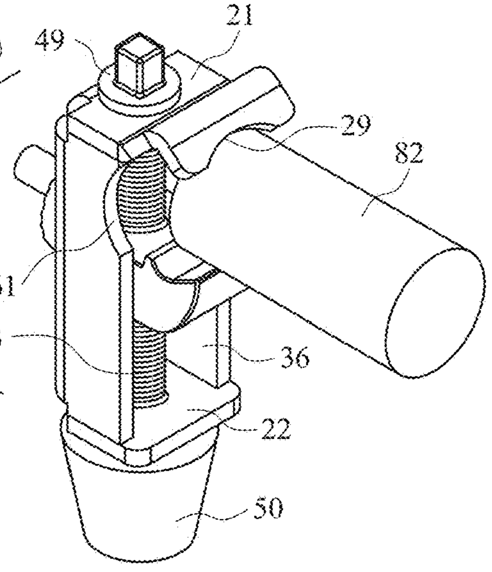

As can be seen from FIGS. 5A and 5B, the shape of the jaw is such that it allows fastening of the device to different type of elements of the instrument and to such elements having different orientations.

The first and second jaws 27, 28 comprise a concave and/or rounded inner surfaces 53, 54, respectively forming a canal-shaped clamping surfaces suitable for clamping a cylindrical element. These concave surfaces 53, 54 extend in a direction that is perpendicular to the axis of the rod 23.

The concave and/or rounded surfaces are substantially complementary to and/or effective to clamp a cylindrical bar 81 extending substantially along the attachment side 94 of the tray 10. Thanks to these concave, substantially complementary surfaces, effective clamping of the device to a bar 81 as shown in FIG. 5A (here considered as a "tangential" bar) is possible. The effective clamping is preferably such that inadvertent detachment of the device from the instrument to which it is attached is prevented.

Thanks to the longitudinal extension of the fastener 20 and the shaped surfaces 53, 54 of the first and second claws, the fastener 20 of the embodiment shown is suitable to clamp (tangentially oriented) cylindrical rods or bars having diameters of from 0.5 cm and up to 5 cm, preferably 0.7 and up to 4.5 cm.

In addition, the fixed jaw 28 comprises a curved cut-out 29, allowing the jaw to clamp to a cylindrical bar 82 extending substantially perpendicular to the attachment side or proximal side 94 of the tray, as shown in FIG. 5B, and thus perpendicularly to the tangential bar 81.

The fastener 20 of the invention may be adapted to be fixed to bars having any cross section, such as the cross section of any polygon, including rectangular, hexagonal, elliptical and circular cross-section, for example. The fastener may also be adapted for fixing to a profile strut, including struts having a profile selected from T, L, U and H-shaped profiles, for example. The fastener may be adapted to such bar or profile by providing jaws 27, 28 having complementary, generally concave forms adapted to receive such bars, struts and/or profiles. As mentioned elsewhere, the invention also encompasses different fasteners, which are particularly adapted for fixing the device to any one of said bar, strut, or profile, or board, for example. The fasteners may be used preferably interchangeably with the tray, and are preferably detachably mounted with respect to the tray.

In a preferred embodiment, the bar 81, 82 is tube or a cylinder having a circular cross section, for example a right solid cylinder.

The overall longitudinal extension of the fastener 20 is defined by the assembled rod 23 and knob 50, thus extending from the top of the screw heat 59 to the free extremity of the hand-actionable knob 50. Preferably, this longitudinal extension is smaller than the longitudinal extension of the linkage bar 35 to which the fastener is pivotally connected by way of the first articulation 30.

As can be seen in by comparing FIG. 2 with FIG. 7, the fastener can be rotated by 90° or more by way of the first articulation 30, when articulation 30 is in an unblocked release position. The position of the fastener 20 as shown in FIG. 7 makes it in particular possible for the device to attached to a vertically extending bar or rod, as used, for example, in a microphone stand, instrument stands, music stands, cowbell holder, an electronic drum rack, a cymbal stand, a keyboard stand, and instrument stands in general, for example.

The fastener 20 is preferably provided so as to be able to rotate 90° or more, preferably 120° or more, even more preferably 180° or more and most preferably 360° by way of the first articulation 30, when articulation 30 is in an unblocked release position.

Turning back to FIG. 3 and the auxiliary tray 15, one can see that one or several pairs of rails 83, 84 are provided on the underside 14 of the main tray 10. The rails extend perpendicularly to a free side 91, 92, 93 of the main tray. On the other hand, the auxiliary tray 15 comprises an extension or tongue 85 on the side of the auxiliary tray that is to be joined with a free side of the main tray. The extension 85 can be inserted in the rails 83, 84 thereby connecting the auxiliary tray in a releasable manner to the main tray. In the embodiment shown, a latch 86 acting on lower surface 14 of the main tray is provided in the extension 85, the purpose of which is to increase the friction between the extension and the rails of the main tray, thereby rendering the connection of the auxiliary tray to the main tray more stable.

As can be seen in FIG. 3, a pair of rails 83, 84 is provided with respect to each of the sides 91, 92 and 93 of the main tray, except the attachment side 94, where the device is connected to the instrument by way of the fastener. Accordingly, this arrangement gives the user the option to connect the auxiliary tray at any one of the three free sides of the main tray. The user is thus free to choose the side of the try where to connect the auxiliary tray 15.

In an embodiment, the device comprises two or more auxiliary trays 15. In accordance with this embodiment, a user can connect or lock two or more auxiliary trays at two or even all three free sides 91-93 of the main tray 10.

In the embodiment shown, the auxiliary tray is provided in a completely detachable form by drawing the tray 15 out of the rails 83, 84. In other embodiments, not shown, the auxiliary tray may stay movably connected to the tray, for example like a drawer that can be inserted below the upper surface 11 of the main tray 10, or in a hinged manner. For example, the auxiliary tray is provided in an extractable manner from the device. In the latter cases, the device preferably comprises means for arresting the auxiliary tray in the extracted position of use and/or the retracted position.

Figure 8:
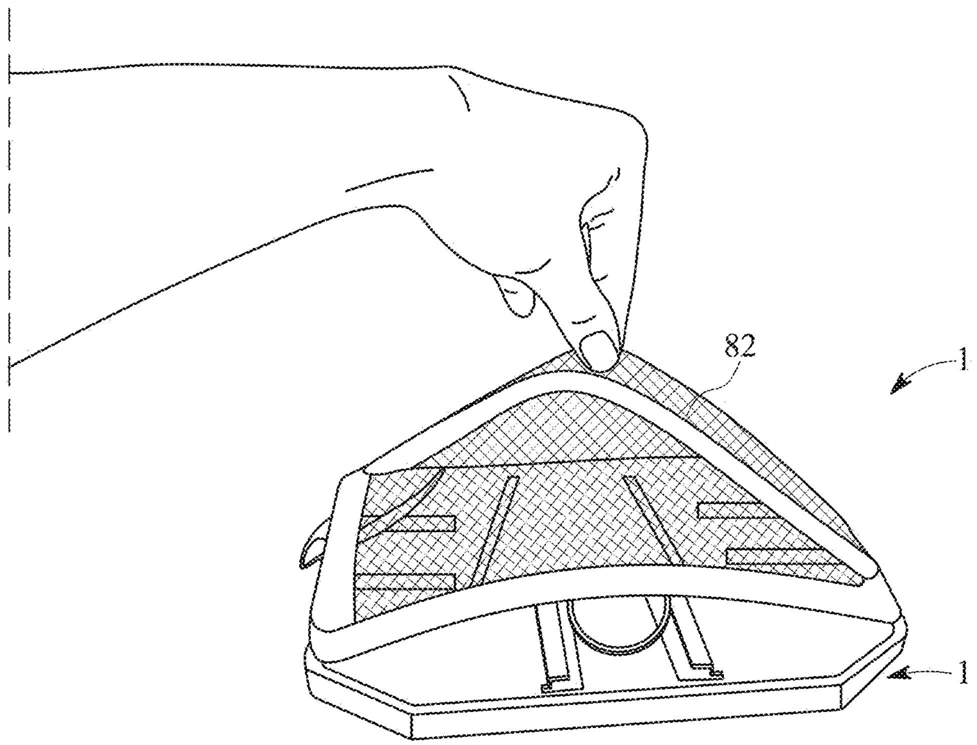
FIG. 8 is a photograph of another embodiment of the device of the invention, which is placed up-side down, and which shows the net the is attached to the tray of the device, wherein said tray is held by the hand for illustration.

As shown in FIGS. 2 and 3, the device preferably comprises a plurality of extensions, pegs and/or hooks 80, provided for allowing the connection of a net 82 extending or spanning the tray below the tray, as shown in FIG. 8. Preferably, said at least two, preferably three and most preferably four extensions, pegs and/or hooks 80 are provided at an outline and/or border of said tray. In an embodiment, the extensions are provided at or in vicinity to the corners of the tray. In another embodiment, the extensions are provided at the lower surface 14 of the tray 10. The net, when connected to said extensions 80, extends preferably below the tray. The net is also provided for placing or tidying objects, generally of the person playing the instrument. Thanks to the net, the device provides different levels for putting things along a horizontal axis. Preferably, the net 82 comprises elastic bands, e.g. a rubber band, each band forming a loop, for hanging or attaching the net to the extensions 80 by way of said loops.

In an embodiment, one selected from the tray 10, the auxiliary tray 15 or another part of the device is mater from a magnetic material, preferably from steel, for example from steel sheet.

In a preferred embodiment, device of the invention is provided with one or more magnets, preferably permanent magnets, which allow the attachment of music paper and/or partition on the tray 10 or auxiliary tray 15.

In an embodiment, the devise of the invention is further provided with a mouse pad fitting on the tray 10. Accordingly, the device is equipped for placing a computer mouse one the tray and operating the mouse as it is placed on the tray, preferably for wirelessly controlling other objects, in particular a computer, that is placed further away.

As a general remark, it is noted that the device of the invention is preferably provided with hand-actionable means for adjusting the orientation of the tray, in particular for unlocking, unblocking or releasing said first and/or second articulations 30, 40, and also for blocking or locking said articulations. Furthermore, the fastener is preferably provided with a hand actionable handle, knob, butterfly, nut and the like for rigidly connecting the device to the music instrument. Accordingly, it is preferred that a user, in particular a person playing the instrument, can attach, remove and adjust the device of the invention preferably without the need of any tool, such as a screwdriver, wrench, key, or any specially adapted tool.

While certain of the preferred embodiments of the present invention have been described and specifically exemplified above, it is not intended that the invention be limited to such embodiments. Various modifications may be made thereto without departing from the scope and spirit of the present invention, as set forth in the following claims. Herein below, examples of the invention are disclosed. These examples are for illustration only and are not intended to limit the scope of the present invention.

What is claimed is:

1. A device comprising:

a tray, a fastener suitable for fastening the tray, at the option of a user, to one selected from the group consisting of: (a) a drum hoop and (b) a bar, and, first and second articulations adapted for adjusting and blocking a position of the tray with respect to the fastener, wherein said first and second articulations define first and second axis of rotation (x, y), respectively, which are substantially extending perpendicular to each other, wherein said tray comprises a support surface adapted for putting an object on said tray, wherein said fastener comprises a first jaw and a second jaw, provided for clamping said drum hoop and/or said bar, wherein at least one of said first and second jaws is provided movable relative to the other jaw along a third axis (z), said third axis (z) extending substantially perpendicular to both, said first and second axis (x, y) when said bar is clamped so as to extend substantially in parallel to said second axis (y), wherein the device comprises a linkage bar, which is connected to said fastener at a first articulation and to said tray via a second articulation, wherein said first and/or said second articulation comprise a blockable pivot joint and/or an adjustable pivot joint.

2. The device of claim 1, wherein said fastener comprises a shaft extending along said first axis (x), said shaft being rigidly connected on said fastener and defining the rotation axis of said first articulation.

3. The device of claim 1, wherein said second articulation is rigidly connected to said tray and is provided so as to enable a rotation of 100° or more of said tray with respect to a sub-assembly comprising said fastener and said first articulation, said second articulation allowing the tray to be adjusted between at least first and second positions when said device is connected to said drum hoop or to said bar, wherein said first position is a position of use, in which said support surface of said tray is provided horizontally, and, wherein said second position is a position of non-use, where said tray is in which said support surface of said tray is provided vertically, said second articulation being provided to enable said tray to be adjusted between said first and second positions.

4. The device of claim 1, wherein said second articulation comprises two spaced-apart partial and substantially co-axial articulations, wherein each of said spaced apart partial articulations comprises a hand-actionable release element, wherein both release elements of said second articulations need to be un-tightened in order to adjust an angular position of said second articulation.

5. The device of claim 4, which comprises a longitudinal linkage bar comprising first and second spaced-apart positions and/or extremities, wherein said spaced-apart partial articulations are provided at said spaced apart positions and/or extremities of said linkage bar, wherein said first articulation is provided at a central position of said longitudinal linkage bar.

6. The device of claim 1, wherein said tray is a main tray, and wherein said device further comprises an extension or auxiliary tray, wherein said extension tray is adapted for detachable connection to said tray or is movably connected to said tray.

7. The device of claim 6, wherein the main tray comprises two or more free lateral sides and wherein said main tray is configured for enabling attachment of said extension or auxiliary tray, at the option of the user, at any one of said two or more free lateral sides.

8. The device of claim 6, which comprises two or more extension trays, for detachable connection to two or more free lateral sides of the main tray.

9. The device of claim 1, wherein said fastener comprises a housing and wherein said first jaw is provided movably within the housing, said housing comprising top and bottom walls each comprising a through hole, wherein a threaded fastening shaft extends through said through holes, wherein a hand-actionable release element is provided at a first extremity of said shaft, and a screw head, actionable by a tool, is provided at a second extremity of said fastening shaft, wherein said hand-actionable release element and said screw head are provided, independently, for displacing said first jaw when attaching the device to, or detaching it from, said drum hoop and/or bar.

10. The device of claim 1, wherein said fastener comprises a movable jaw and a housing for said first jaw, wherein said housing comprises two lateral side walls, wherein said movable jaw is provided between said lateral side walls, and wherein said lateral side walls comprise rounded or concave parts adapted for receiving a cylindrical bar extending along said second axis (y) when said device is fastened to said cylindrical bar.

11. The device of claim 1, wherein said first and second articulations are adapted for allowing the adjustment of the position of the support surface so as to be substantially in parallel to horizontal.

12. The device of claim 1, wherein said linkage bar is longitudinal and comprises a central part, where said linkage bar is adjustably connected to said fastener, and/or first and second extremities, where said linkage bar is adjustably connected to said tray or to a pair of lugs, said lugs being rigidly connected to said tray.

13. The device of claim 1, wherein said second articulation comprises a hand-actionable release element and a shaft, wherein said device comprises a linkage bar connected to said fastener and a lug rigidly connected to said tray, wherein said linkage bar and/or said lug comprises a hole through which said shaft extends, said shaft and said hand-actionable release element thereby providing a pivotable connection of said linkage bar with respect to said lug.

14. The device of claim 13, wherein said second articulation comprises a friction enhancing or blocking device suitable for avoiding and/or blocking the relative rotational movement between said linkage bar and said tray and/or between said linkage bar and said lug.

15. The device of claim 1, wherein said first and second articulations comprise a hand-actionable release element, provided for unblocking and blocking the articulation and thereby for preventing and enabling, respectively, a rotational movement of said articulation, wherein said hand-actionable release element comprises, independently for said first and second articulations, one selected from a handle, a lever, a knob, a turning wheel, a butterfly screw, and a butterfly nut.

16. The device of claim 1, wherein said device comprises a longitudinal linkage bar comprising first and second extremities, said linkage bar extending substantially in parallel to an axis of rotation of said tray, wherein said second articulation comprises a pair of hand-blockable and/or hand-unblockable articulations provided at said first and second extremities, said articulations allowing rotation of said tray with respect to said axis of rotation when unblocked.

17. The device of claim 1, wherein said device comprises a longitudinal linkage bar comprising one or two extremities each comprising a hole for pivotally connecting said linkage bar with said tray and/or with a lug connected to said tray.

18. A fastener suitable for clamping an object, to a drum hoop or to a bar, said fastener comprising first and second jaws, a fastener further comprising a housing or guiding rail, wherein said first jaw is provided movable relative to the second jaw along a first tray, to a drum hoop or to a bar, said fastener comprising first and second jaws, said axis (y) in said housing or guiding rail, wherein said second jaw is rigidly connected to said housing or guiding rail, wherein said first and second jaws are further provided for clamping said drum hoop and/or said bar extending substantially along a second axis (y), said second axis being perpendicular to said first axis (x), wherein said fastener further comprises a shaft extending along a third axis (z), perpendicular to both, said first and second axis (x, y), said shaft being rigidly connected on said fastener and defining a rotation axis for said object connected to said fastener.

19. The fastener of any one of claim 18, wherein both said first and second jaws comprise a concave and/or rounded clamping surface, respectively, forming a canal extending along said second axis (y), wherein one or both of said first and second jaws comprises a rounded cut-out, adapted to receive a cylindrical bar extending along an axis (z), which is perpendicular to both, said first and second axis (x, y), wherein said device can be fixed to a free extremity of said cylindrical bar with said cylindrical bar being placed in said cut-out and clamped between said first and second jaws.

20. The fastener of claim 18, wherein said housing comprises two lateral side walls, wherein said lateral side walls comprise rounded or concave parts adapted for receiving a cylindrical bar extending along said second axis (y) when said fastener is clamped to said cylindrical bar.

* * * * *